Patented Mar. 10, 1953

2,631,172

UNITED STATES PATENT OFFICE 2,631,172

PREPARATION OF ARYL HALOALKANES

Louis Schmerling, Riverside, Ill., assignor to Universal Oil Products Company, Chicago, Ill., a corporation of Delaware No Drawing. Application January 29, 1948, Serial No. 5,207

3 Claims. (Cl. 260—651)

This invention relates to a process for preparing aryl haloalkanes which also may be referred to as (haloalkyl) aromatic hydrocarbons. More particularly the process relates to the preparation of monohaloalkyl benzene hydrocarbons containing a halogen selected from the group consisting of chlorine and bromine.

An object of this invention is to prepare (haloalkyl) aromatic hydrocarbons.

Another object of this invention is to prepare a phenyl haloalkane.

A further object of this invention is to prepare a phenyl chloroalkane.

A still further object of this invention is to prepare an alkylphenylchloroalkane.

An additional object of this invention is to prepare 1-chloro-3-methyl-3-phenylbutane.

One specific embodiment of this invention relates to a process for preparing an arylhaloalkane which comprises reacting an aromatic hydrocarbon having a replaceable nuclear hydrogen atom with a dihaloalkane having one halogen atom combined with a carbon atom that is bound chemically to three other carbon atoms in the presence of a catalyst comprising essentially a solution of an aluminum halide dissolved in a nitro hydrocarbon.

Another embodiment of this invention relates to a process for preparing an arylchloroalkane which comprises reacting an aromatic hydrocarbon having a replaceable nuclear hydrogen atom with a dichloroalkane having one chlorine atom attached to a non-tertiary carbon atom in the presence of a catalyst comprising essentially a solution of aluminum chloride dissolved in a nitroparaffin.

I have found that certain dihaloalkanes in which a halogen atom is attached to a tertiary carbon atom and the other halogen atom is attached to a non-tertiary carbon atom may be reacted with an alkylatable aromatic hydrocarbon in the presence of an aluminum chloride-nitrohydrocarbon catalyst to form an aryl monohaloalkane. This is an unexpected result since similar reactants in the presence of unmodified aluminum chloride catalyst produced a diarylalkane and substantially all of the halogen content was eliminated as hydrogen halide.

Aromatic hydrocarbons which may be used in this process include mono-nuclear and also poly-nuclear hydrocarbons. The mono-nuclear hydrocarbons or benzenoid hydrocarbons comprise benzene, toluene, xylenes, ethylbenzene, diethylbenzenes, propylbenzenes, and other alkyl benzenes in which the alkyl group contains more than three carbon atoms. These aromatic hydrocarbon starting materials contain at least one replaceable nuclear hydrogen atom. Naphthalene, alkylnaphthalenes, and other polycyclic aromatic hydrocarbons containing a replaceable nuclear hydrogen atom may also be used as charging stocks in this process. In some cases other aromatic compounds in which a nuclear hydrogen atom is replaced by a halogen atom, a hydroxyl group, or an amino group are also utilizable as charging stocks.

Dihaloalkanes useful in this process contain halogen atoms selected from the members of the group consisting of chlorine and bromine. These dihaloalkanes also have one halogen atom attached to a tertiary carbon atom (that is, a carbon atom which is combined with three other carbon atoms) and a second halogen atom attached to a non-tertiary carbon atom. Suitable dihaloalkanes include 1,3-dichloro-3-methylbutane, 1,3-dibromo-3-methylbutane, 1,2-dichloro-2-methylpropane, 2,4-dichloro-4-methylpentane and the like.

Suitable catalysts for use in the process of this invention comprise solutions of an aluminum halide such as aluminum chloride, aluminum bromide, or mixtures thereof, in a nitrohydrocarbon such as a nitroparaffin or a nitroaromatic hydrocarbon. The nitroparaffins include nitromethane, nitroethane, nitropropanes, and nitroparaffins of higher molecular weights. Of the nitroaromatic hydrocarbons, nitrobenzene is generally preferred as a solvent for aluminum chloride and aluminum bromide. The different nitrohydrocarbons which may thus be used for producing solutions containing aluminum halides, and utilizable as catalysts in the present process, are not necessarily equivalent in that some nitro hydrocarbons are more suitable than others for producing aluminum halide solutions, and particularly aluminum chloride solutions of high catalytic activities. At about 20° C., the lower members of the nitroparaffin series including nitromethane, nitroethane, and nitropropanes, dissolve as much as an equal weight of aluminum chloride to form a homogeneous liquid which may be contacted readily with hydrocarbons and dihaloalkanes in the process of this invention. A nitroparaffin such as nitromethane has a relatively high dissolving power for aluminum chloride and forms with aluminum chloride a solution which is freely miscible with the aromatic hydrocarbon as in the case of benzene, and a nitroparaffin may thus be said to serve as a solutizer for dispersing aluminum chloride in the aromatic hydrocarbon subjected to reaction. Thus if one part by weight of aluminum chloride is dissolved in its own weight of nitromethane and the solution is added to benzene, a clear, yellow solution results with either 1 or 100 parts by weight of benzene, and accordingly, a homogeneous catalytic reaction may be carried out in the presence of such an aluminum chloride solution. Aluminum chloride so dissolved or dispersed in a nitroparaffin and an aromatic hydrocarbon may thus be brought into intimate contact with a dihaloalkane so that one molecular proportion of aluminum chloride can readily catalyze the reaction of as much as 250 molecular proportions of aromatic hydrocarbon. Essentially the same solutizing effect is observed when any other order of mixing is used for the aromatic hydrocarbon, aluminum chloride, and nitroparaffin. Thus while only about 0.2 part by weight of aluminum chloride dissolves in 100 parts by weight of pure benzene, the presence of 0.6 part by weight of nitromethane in the benzene increases this solubility to about 3 parts by weight of aluminum chloride in 100 parts by weight of benzene. When three parts by weight of aluminum chloride are shaken with 40 parts by weight of benzene, there is no visible evidence of the formation of a solution, but after addition of 0.25 part by weight of nitromethane, the benzene layer becomes yellow. A further addition of 0.35 part by weight of nitromethane causes from 30 to 50% of the aluminum chloride to dissolve, while after another addition of 1.1 parts by weight of nitromethane, all of the originally introduced aluminum chloride dissolves to give a pale yellow solution. Similarly, the addition of one part by weight of 2-nitropropane to a mixture of three parts by weight of aluminum chloride and 40 parts by weight of benzene, causes the solution of about one-half of the aluminum chloride, while further addition of one part by weight of 2-nitropropane causes all of the aluminum chloride to dissolve and form a clear solution of reddish, orange color. The particular nitroparaffin chosen as a solutizer for aluminum chloride is also dependent upon the nature and proportions of the aromatic hydrocarbon and dihaloalkane being reacted, the conditions of operation and other factors.

Solutions of the aluminum halide in the aromatic hydrocarbon may be obtained not only by use of liquid nitroparaffins and liquid nitroaromatic hydrocarbons, but even by use of crystalline nitroaromatic hydrocarbons. The crystalline nitro-compounds, which may be considered to act as solutizers for the aluminum halide in the aromatic hydrocarbon, include m-dinitrobenzene, nitronaphthalenes, trinitrotoluene, etc.

When aluminum chloride in the form of a solid is used for catalyzing the condensation reaction of an aromatic hydrocarbon with a dihaloalkane, the principal reaction of the process is the formation of a diarylalkane and the elimination of substantially all of the halogen of the dihaloalkane in the form of a hydrogen halide. Also sludge-like material forms upon the surface of the aluminum chloride catalyst during use and thus lowers the catalytic activity of the aluminum chloride so that it is necessary to withdraw the sludge-like material and add fresh aluminum chloride in order to proceed with the reaction. When condensing an aromatic hydrocarbon with a dihaloalkane in the presence of aluminum chloride dissolved in a nitroparaffin, the catalyst is substantially in the form of a liquid mixture or solution which is contacted readily with the reacting aromatic hydrocarbon and dihaloalkane. Thus relatively high speeds of condensation are obtained with a given quantity of aluminum chloride because substantially all of the aluminum chloride thus introduced into the reaction mixture is available for catalyzing the reaction, a condition radically different from that obtained when using solid particles of aluminum chloride when only the aluminum chloride on the surface of the particles can be contacted with the reacting aromatic hydrocarbon and dihaloalkane.

The condensation of an aromatic hydrocarbon with a dihaloalkane to form a (haloalkyl) aromatic hydrocarbon is carried out preferably in the presence of a solution of aluminum chloride in a nitroparaffin and at a temperature of from about $-20°$ to about $100°$ C., and at a pressure of from substantially atmospheric to about 100 atmospheres. The exact temperature employed in a given treatment depends upon the properties of the aromatic hydrocarbons charged and the activity of the catalyst. Preferred reaction temperatures include the range of from about $-20°$ to about $+50°$ C., in the presence of aluminum chloride and aluminum bromide or mixtures thereof. Temperatures between $50°$ C. and $100°$ C. are sometimes used but in general the yield of (haloalkyl) aromatic hydrocarbon decreases at the higher temperatures.

In effecting reaction between an aromatic hydrocarbon and a dihaloalkane according to the process of this invention, the exact method of procedure varies with the nature and proportions of the reaction constituents. A simple procedure utilizable in the case of an aromatic hydrocarbon which is normally liquid (or if solid is readily soluble or dispersible in a nitroparaffin or other substantially inert liquid) and a dihaloalkane consists in contacting the aromatic hydrocarbon and dihaloalkane with a solution of aluminum chloride or aluminum bromide in a nitrohydrocarbon, preferably a nitroparaffin, using either batch or continuous operation. Thus in batch-type treatment a solution of aluminum chloride in a nitroparaffin is charged to a reactor containing an aromatic hydrocarbon and the reaction mixture is then stirred or otherwise agitated while a dihaloalkane is added thereto preferably together with relatively small amounts of aluminum chloride to effect formation of a (haloalkyl) aromatic hydrocarbon. Only as much of the aluminum chloride-nitroparaffin solution is added as is required for catalyzing the condensation reaction at a desired rate, and the condensation may thus be catalyzed by the use of a relatively small quantity of aluminum chloride. After the reaction, the product may be treated with a small amount of water, sufficient to hydrolyze the aluminum chloride and the resulting mixture of reaction products is washed, dried, and separated by fractional distillation. The desired (haloalkyl) aromatic hydrocarbon product is then recovered and unconverted aromatic hydrocarbon and nitroparaffin are recycled to further use in the process.

Continuous types of condensation treatment is carried out by introducing the dihaloalkane into a flowing stream of catalyst solution and normally liquid aromatic hydrocarbon or normally solid aromatic hydrocarbon dissolved in a suitable substantially non-reactive liquid solvent. The mixture of hydrocarbons, dihaloalkane and catalyst contained therein and preferably some additional hydrogen chloride is passed through a baffled mixer, or other suitable reactor to effect intermittent contact of the catalyst solution with the reactants. The conditions of temperature and pressure employed in a condensation treatment are within the limits indicated above, but the particular conditions employed in any condensation treatment vary with the molecular weight and reactivity of the aromatic hydrocarbon and the dihaloalkane, the concentration and activity of the catalyst and other factors. It is generally advantageous to dilute the dihaloalkane with a portion of the aromatic hydrocarbon and to introduce the resultant mixture at a plurality of points throughout the reaction zone rather than to commingle all of the dihaloalkane with the aromatic hydrocarbon prior to introduction to the catalyst zone.

In the reaction mixture subjected to catalytic treatment, it is preferable to have present from about 1 to about 40 molecular proportions of aromatic hydrocarbons per one molecular proportion of dihaloalkane. The reaction mixture obtained from such a continuous treatment is then reacted with water or ammonia to decompose the remaining aluminum chloride and the liquid product is then dried and distilled to separate unconverted aromatic hydrocarbon (haloalkyl), aromatic hydrocarbons, and nitrohydrocarbon solvent. The unconverted aromatic hydrocarbon and the recovered nitrohydrocarbon solvent are recycled to further use in the process.

The following examples are given to illustrate the character of the result obtained by the use of the present process, although the data presented are not introduced with the intention of restricting unduly the broad scope of the invention.

*Example I*

A solution of 26 grams of 1,3-dichloro-3-methylbutane in 91 grams of benzene was stirred with 2 grams of aluminum chloride at 2° C. for eight hours. There was a very copious evolution of hydrogen chloride. The temperature was then allowed to rise to room temperature (without stirring) during eight hours, the upper layer was separated from 9 grams of deep red catalyst sludge, washed, dried, and distilled. There was obtained 9.5 grams (28% yield) of 1-chloro-3-methyl-3-phenylbutane, B. P. 87–89° C. at 2 mm., $n_D^{20}$ 1.5208 and 12 grams (29% yield) of a diphenyl pentane, B. P. 129–131° C. at 2 mm., $n_D^{20}$ of 1.5619.

*Example II*

A solution of 4 grams of aluminum chloride in 6 grams of nitromethane was added to a solution of 25 grams of 1,3-dichloro-3-methylbutane at 24° C. in 80 grams of benzene in an Erlenmeyer flask. A clear solution resulted; much hydrogen chloride was evolved after one minute, the temperature rising to 29° C. The flask was cooled to 20–21° C. and kept at this temperature overnight. The product was washed, dried and distilled. There was obtained 14 grams (43% yield) of the 1-chloro-3-methyl-3-phenylbutane, B. P. 81–82° C. at 1.5 mm.; $n_D^{20}$ 1.5195. Moderation of the activity of the aluminum chloride by use of the nitromethane diluent thus gave a beneficial effect.

*Example III*

A solution of 140 grams of 1-3-dichloro-3-methylbutane in 240 grams of benzene was added during two hours to a stirred solution of 10 grams of aluminum chloride and 10 grams of nitromethane in 240 grams of benzene, the temperature being kept at 25–27° C. The mixture was stirred for an additional hour, then washed, dried, and distilled. There was obtained 99 grams (55% yield) of the 1-chloro-3-methyl-3-phenylbutane, B. P. 93° at 3 mm., $n_D^{20}$ 1.5195. There was obtained 32 grams (22% yield) of a crystalline product boiling at 171–173° at 2.5 mm. and melting at 64–65°; analysis showed that this product was p-bis-(γ-chloro-t-pentyl)-benzene formed by the further reaction of the 1-chloro-3-methyl-3-phenylbutane with 1,3-dichloro-3-methylbutane.

*Example IV*

The reaction of 50 grams of 1,3-dichloro-3-methylbutane with 100 grams of t-pentylbenzene in the presence of 5 grams of aluminum chloride dissolved in 3 grams of nitromethane was carried out using a procedure similar to that described in Example III and a reaction temperature of 2° C. There was obtained a 62% yield (56 grams) of 1-chloro-3-methyl-3-(p-t-pentylphenyl)butane, B. P. 133–136° C. at 2 mm.; $n_D^{20}$ 1.5085.

I claim as my invention:

1. A process for preparing an aryl chloroalkane which comprises reacting a benzene hydrocarbon having a replaceable nuclear hydrogen atom and 1,3-dichloro-3-methylbutane at a temperature of from about −20° to about 50° C. in the presence of aluminum chloride dissolved in a nitrohydrocarbon.

2. The process of claim 1 further characterized in that said nitrohydrocarbon is a nitroparaffin.

3. A process for preparing 1-chloro-3-methyl-3-phenylbutane which comprises reacting benzene and 1,3-dichloro-3-methylbutane at a temperature of from about −20° to about 50° C. in the presence of a catalyst comprising essentially a solution of aluminum chloride dissolved in nitromethane.

LOUIS SCHMERLING.

REFERENCES CITED

The following references are of record in the file of this patent:

UNITED STATES PATENTS

| Number | Name | Date |
|---|---|---|
| 2,246,762 | Schirm | June 24, 1941 |
| 2,308,419 | Heitz et al. | Jan. 12, 1943 |
| 2,355,850 | Dreisbach | Aug. 15, 1944 |

OTHER REFERENCES

Groggins, "Unit Processes in Organic Synthesis," 3d edition, pp. 768-9 (1947).